United States Patent
Lee et al.

(10) Patent No.: US 7,988,372 B2
(45) Date of Patent: Aug. 2, 2011

(54) CAMERA HAVING DETACHABLE LENS MODULE

(75) Inventors: Chang-bae Lee, Suwon-si (KR); Seung-yong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/649,436

(22) Filed: Dec. 30, 2009

(65) Prior Publication Data

US 2010/0166417 A1    Jul. 1, 2010

(30) Foreign Application Priority Data

Dec. 31, 2008  (KR) .................. 10-2008-0138250

(51) Int. Cl.
*G03B 17/00*    (2006.01)
(52) U.S. Cl. ......................................... 396/531
(58) Field of Classification Search .............. 396/25, 396/27, 529, 530, 531; 359/827, 828, 829, 359/830

See application file for complete search history.

(56) References Cited

U.S. PATENT DOCUMENTS

| 4,251,134 A * | 2/1981 | Sato et al. ..................... 359/828 |
| 4,994,829 A * | 2/1991 | Tsukamoto ..................... 396/27 |
| 5,570,153 A * | 10/1996 | Shono ........................... 396/531 |
| 2006/0067679 A1 * | 3/2006 | Suzuki .......................... 396/531 |

* cited by examiner

*Primary Examiner* — W. B. Perkey
*Assistant Examiner* — Warren K Fenwick
(74) *Attorney, Agent, or Firm* — Drinker Biddle & Reath LLP

(57) ABSTRACT

A camera having a detachable lens is provided. More particularly, the camera includes a main body and a lens module configured so that it can be mounted to or detached from the main body according to a rotating state of the lens module with respect to the main body. The camera also includes a first coupling structure that is configured to provide the lens module with coupling when the lens module is set to a mounting position. The camera also includes a secondary coupling structure that is configured to provide the lens module with temporary coupling when the lens module is set to a detaching position. As a result of this structure, an unwanted dropping of the lens module due to an instant loss of supporting force when the lens module is detached from the main body may be prevented.

19 Claims, 12 Drawing Sheets

CAMERA HAVING DETACHABLE LENS MODULE

CROSS-REFERENCE TO RELATED PATENT APPLICATION

This application claims the benefit of Korean Patent Application No. 10-2008-0138250, filed on Dec. 31, 2008 in the Korean Intellectual Property Office, the entire contents of which is incorporated herein by reference.

BACKGROUND OF THE INVENTION

1. Field of the Invention

The present invention relates to a camera having a detachable lens module. More particularly, the present invention relates to a camera having a detachable lens module that prevents the lens module from being dropped due to loss of support when the lens module is being detached from the camera.

2. Description of the Related Art

A camera may be provided with a detachable lens, a camera main body, and a lens module for focusing a subject image on an imaging surface. In such an arrangement, the subject image that is focused through the lens module is converted into an electric signal in the form of an image file. Also in such an arrangement, the lens module and the camera main body are configured so as to be detachably coupled to each other. An examples of a camera having a detachable lens may be a single lens reflex (SLR) camera having a replaceable lens module.

In recent times, cameras having a detachable lens module have been widely distributed and utilized. As a result, the market for such cameras has increased. Also, cameras are about to be released that have a lens module and a camera main body that are minimized in size by removing mirrors and prisms, which are typically considered to be essential components in lens detachable cameras.

However, when a lens module is being detached from a camera main body, the lens module may sometimes drop due to a sudden separation between the lens module and the camera main body. In particular, because sizes of a lens module and a camera main body are minimized according to recent technological developments, a grip on a lens module is weakened, and the above-discussed unwanted lens module drops are more likely to occur. Moreover, such lens modules are expensive and are very susceptible to damage from shock. As a result, such lens modules are easily damaged and unwanted drops such as those discussed above should be minimized.

SUMMARY OF THE INVENTION

The present invention provides a camera having a detachable lens module configured so as to prevent the lens module from being dropped due to a loss of support when the lens module is being detached from a main body of the camera.

According to an embodiment of the present invention, a camera is provided that includes a main body and a lens module configured so that it can be mounted to or detached from the main body according to a rotating state of the lens module with respect to the main body. The camera further includes a first coupling structure that is configured to provide the lens module with coupling when the lens module is set to a mounting position and a secondary coupling structure that is configured to provide the lens module with temporary coupling when the lens module is set to a detaching position.

The first coupling structure may be configured to be in a coupled state when the lens module is set to the mounting position, and is configured to be in a released state when the lens module is set to the detaching position.

The secondary coupling structure may be configured to be in a released state when the lens module is set to the mounting position, and is configured to be in a coupled state when the lens module is set to the detaching position.

The first coupling structure may include: flange portions configured to rotate integrally with the lens module; and coupling pieces configured to form a gap with the main body so that the flange portions are insertable into the gap according to the rotating state of the lens module. The flange portions may be configured to be inserted between the coupling pieces and a rotating guide portion which are configured so as to be separated from each other on the camera body according to the rotating state of the lens module with respect to the main body.

The flange portions may configured to be restricted by the coupling piece when the lens module is set to the mounting position, and the flange portions may be configured to be released from the coupling piece when the lens module is set to the detaching position.

The secondary coupling structure may include a protruding piece that is formed on the lens module; and an anti-escape protrusion that is formed on the main body and configured to be coupled to the protruding piece.

The main body may include a groove that extends in a circumferential direction and is configured so as to receive a rotating range of the protruding piece, which is configured to rotate with the lens module, and the anti-escape protrusion may be formed in the groove.

The anti-escape protrusion may be elastically biased so as to protrude into the groove.

The protruding piece may be configured to move between a first end and a second end of the groove according to a rotating variation between the mounting position and the detaching position of the lens module, and the anti-escape protrusion may be biased toward the second end of the groove.

The protruding piece may include a mounting recess having a shape matching the anti-escape protrusion.

A front edge of the anti-escape protrusion may be rounded.

The lens module and the main body respectively may have contact areas that support each other along the circumferential direction, and the protruding piece and the anti-escape protrusion may be formed adjacent to a shutter switch within the contact areas.

Two or more protruding pieces and two or more anti-escape protrusions may be formed on the lens module and the main body, respectively, at corresponding portions to each other.

According to another embodiment of the present invention, a camera is provided that includes a main body and a lens module. The lens module is configured so that it can be mounted to or detached from the main body according to a rotating state of the lens module with respect to the main body. The main body includes a first coupling piece that is configured to provide the lens module with coupling when the lens module is set to a mounting position, and a second coupling piece that is disposed on a circumferential line with the first coupling piece and that is configured to provide the lens module with temporary coupling when the lens module is set to a detaching position. Also, the lens module includes flange portions that are configured to correspond to the first and second coupling pieces and that are disposed on a circumferential line, and which are configured to be inserted into the first and second coupling pieces.

The first coupling piece may be configured to be coupled to the flange portion at the mounting position, and may be configured to be released from the flange portion at the detaching position.

The second coupling piece may be configured to be coupled to the flange portion at the mounting position and the detaching position.

The first and second coupling pieces may extend in an arc shape, and the second coupling piece may be longer than the first coupling piece.

The second coupling piece may be configures to be closer to a shutter switch than the first coupling piece.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described with reference to accompanying drawings.

Figure 1:
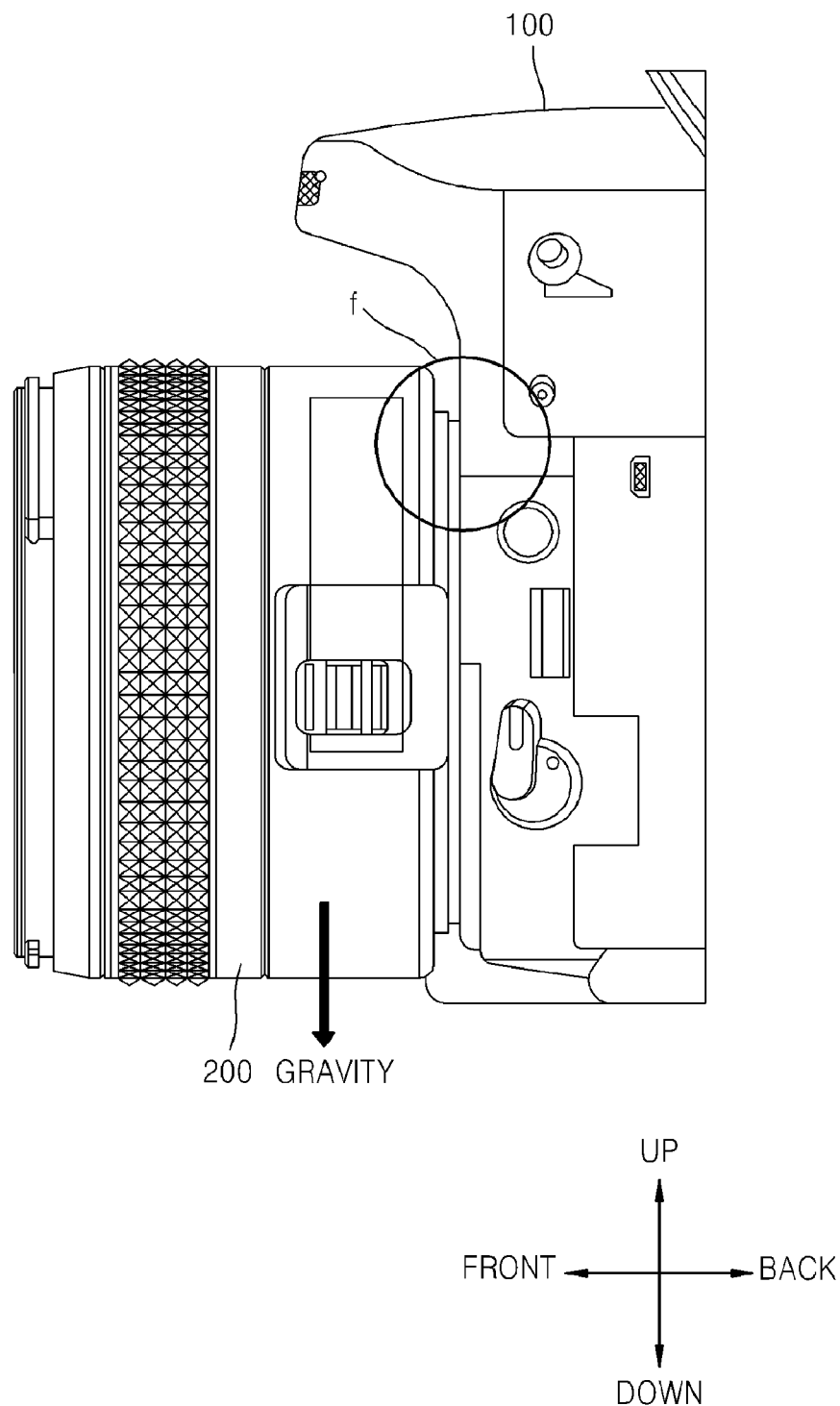
FIG. 1 is a side view of an example of a camera having a detachable lens module according to an embodiment of the present invention.

FIG. 1 is a side view of an example of a camera having a detachable lens module according to an embodiment of the present invention. The camera includes a main body 100 and a lens module 200 mounted on a front portion of the main body 100. The camera may be, for example, a single lens reflex (SLR) camera, the lens module 200 of which may be replaced because the main body 100 and the lens module 200 are configured so as to be detachably coupled to each other. The lens module 200 may be coupled to the main body 100 or separated from the main body 100 at predetermined positions according to its rotating position with respect to the main body 100.

Figure 2:
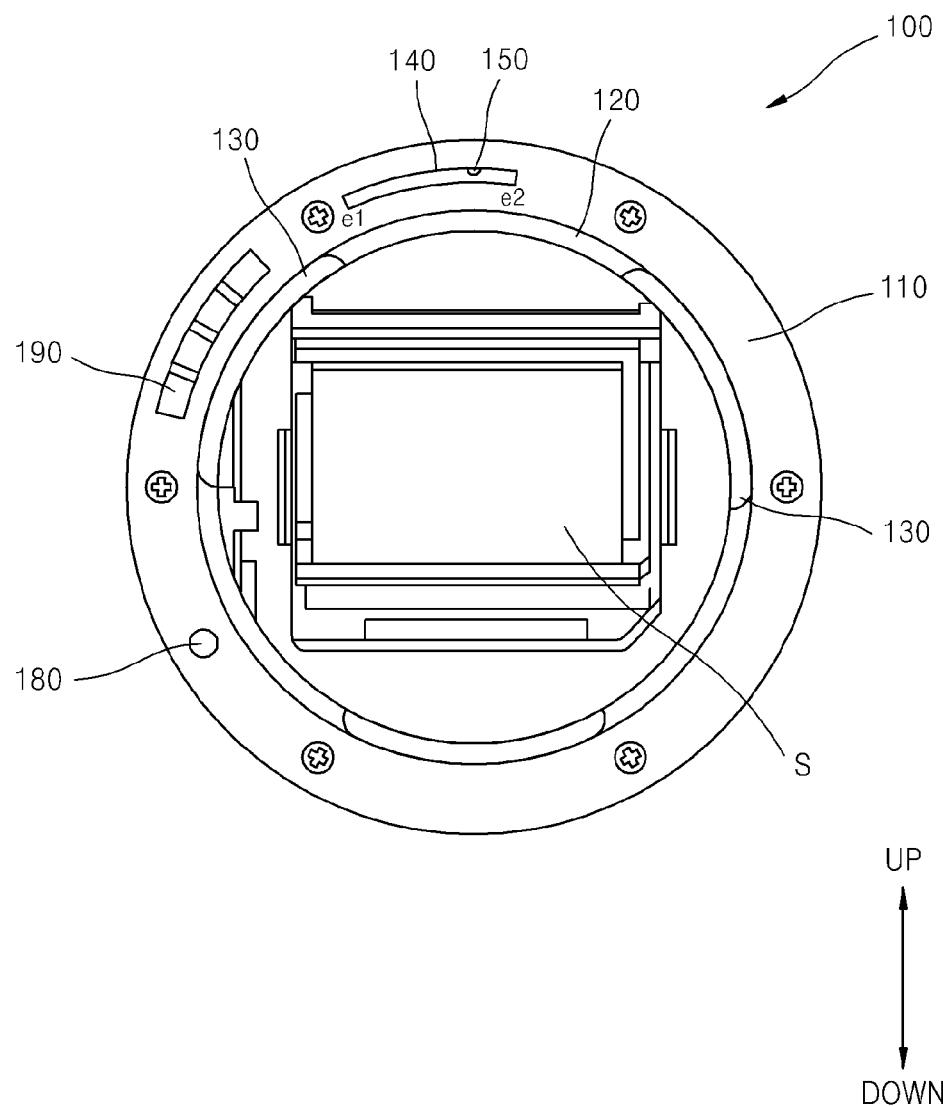
FIG. 2 is a diagram of examples of main parts of a main body of the camera of FIG. 1.

FIG. 2 is a diagram of examples of main parts of the main body 100 of the camera of the example of FIG. 1. The main body 100 includes, for example, an image sensor S converting images of a subject that are focused through the lens module 200 into electric image signals, and a circuit (not shown) converting the image signals output from the image sensor S to appropriate formats.

The main body 100 includes a mounting supporter 110 having a circular boundary, and a rotating guide portion 120 formed along an inner circumference of the mounting supporter 110 to be stepped from the mounting supporter 110. The mounting supporter 110 provides a large supporting surface that contacts the lens module 200 to stably support the lens module 200.

The rotating guide portion 120 guides a rotating operation of the lens module 200 to be mounted onto or detached from the main body 100. For example, the lens module 200, which faces the main body 100, is mounted onto or detached from the main body 100 at a predetermined rotating position while sliding along the rotating guide portion 120 according to control by a user.

Coupling pieces 130 are disposed on one or more portions of the rotating guide portion 120. The coupling pieces 130 may be disposed at positions that divide the circumference of the rotating guide portion 120 into three parts. The coupling pieces 130 may be formed so as to be stepped forward to form a predetermined gap so that flange portions 230 (FIG. 3) of the lens module 200 may be inserted between the coupling pieces 130 and the rotating guide portion 120.

The coupling pieces 130 define the mounting and detaching positions of the lens module 200, for example.

Figure 3:
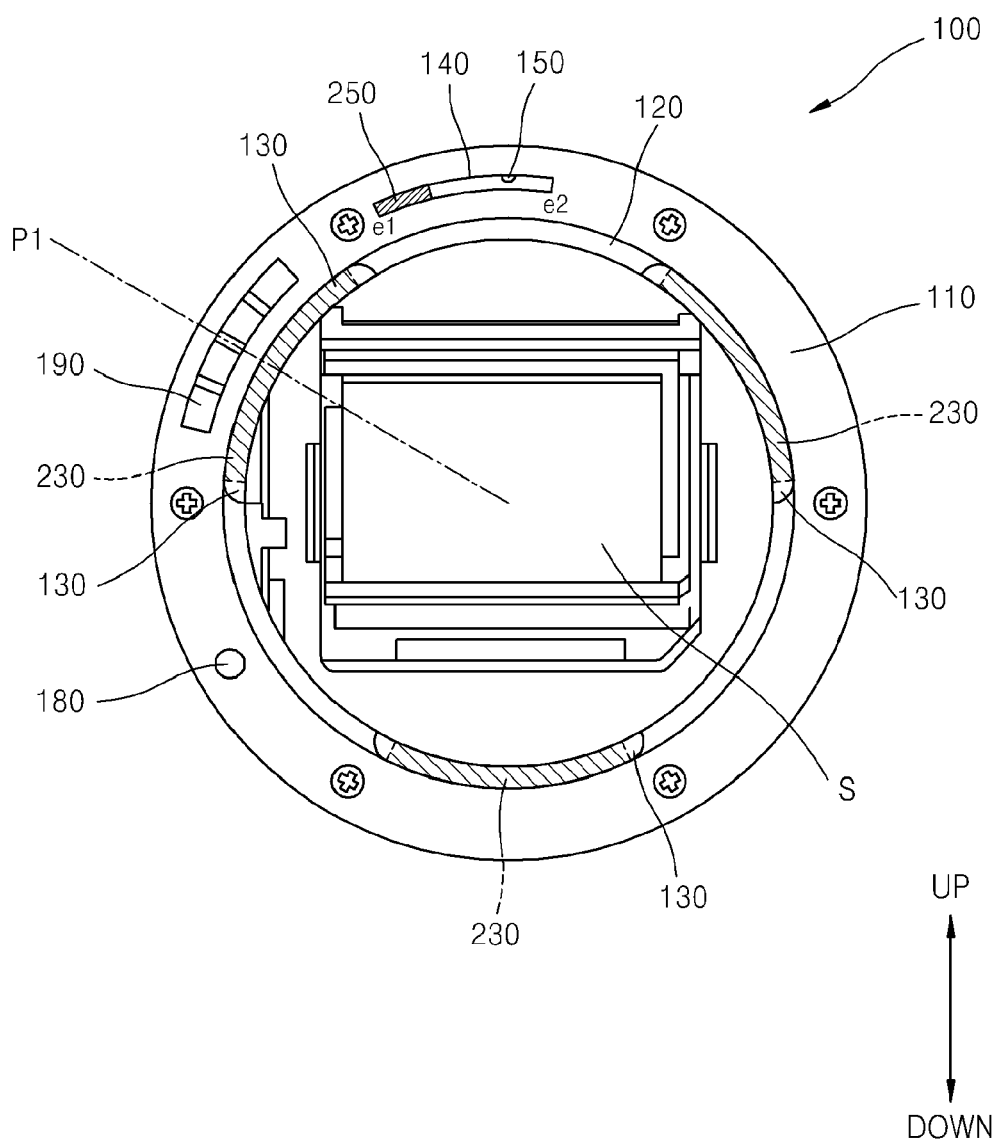
FIGS. 3 and 4 are diagrams showing examples of an attached state and a detached state of the lens module in the camera of FIG. 1.
Figure 4:
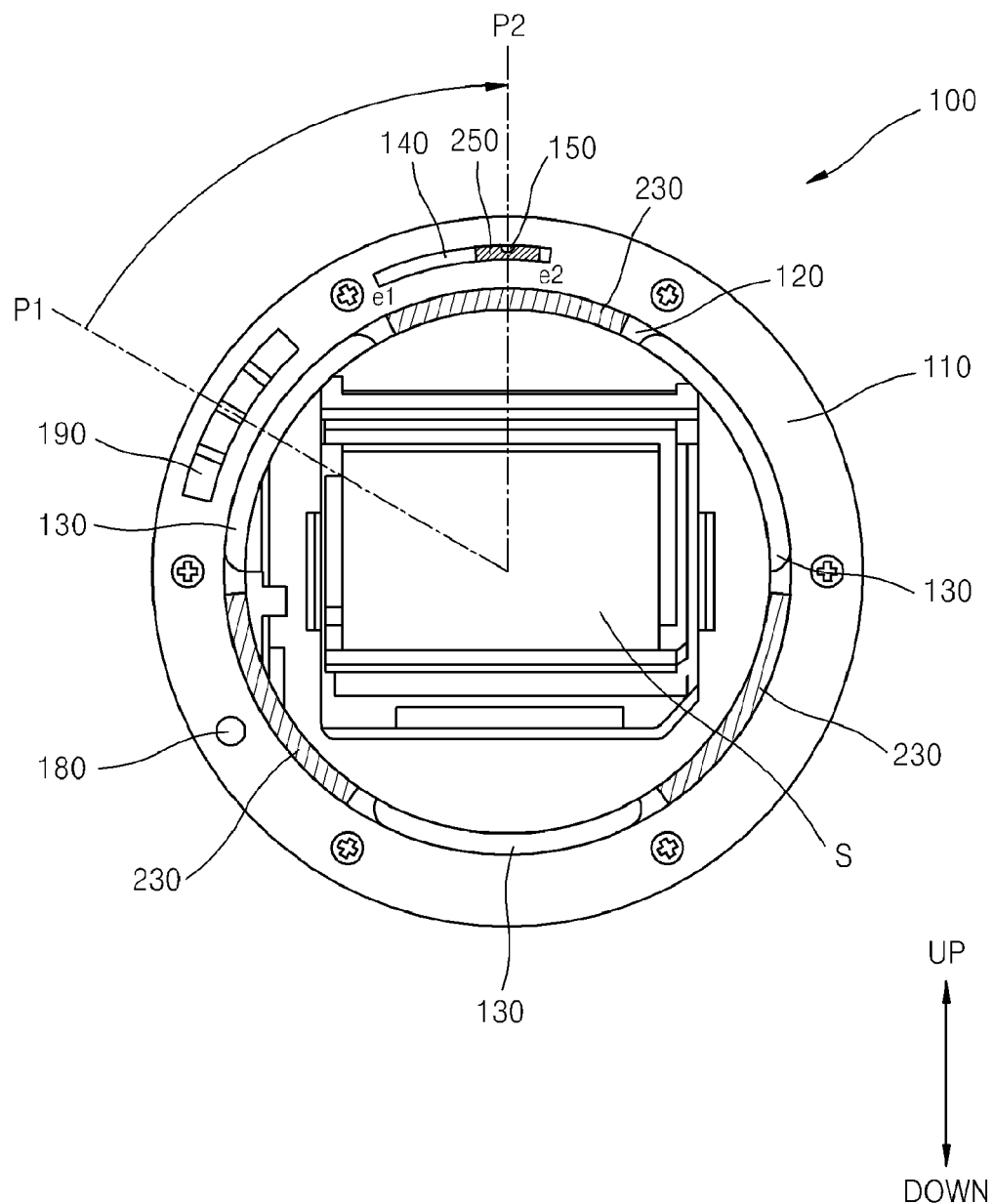

FIGS. 3 and 4 are diagrams showing examples of an attached state and a detached state of the lens module in the camera of the example of FIG. 1. As shown in the example of FIG. 3, at a mounting position P1 of the lens module 200, for example, the flange portion 230 of the lens module 200 overlaps the coupling pieces 130, and is inserted between the rotating guide portion 120 and the coupling pieces 130 to be restricted there between. On the other hand, as shown in the example of FIG. 4, at a detaching position P2 of the lens module 200, the flange portion 230 of the lens module 200 is disposed on an open position between the coupling pieces 130 and the lens module 200 may be detached from the main body 100.

A fixing projection 180 that is connected to a detaching switch (not shown) is disposed on the mounting supporter 110. The fixing projection 180 is elastically biased so as to protrude forward, and is retrieved backward when the detaching switch is pushed. The fixing projection 180 is coupled to a fixing recess 280 (FIG. 6) of the lens module 200 so that the lens module 200 does not freely move from the mounting position P1 to the detaching position P2.

Grooves 140 are formed on one or more portions on the mounting supporter 110. The grooves 140 may have a length that is suitable for receiving the rotating movement of a protruding piece 250 that integrally rotates with the lens module 200. The grooves 140 may be formed on any positions on the mounting supporter 110, for example, may be formed on upper portion of the mounting supporter 110 so as to stably support the lens module 200 against gravity, which acts downward. In general, the user grips the camera so that a shutter switch (not shown) for performing the photographing operation faces upward, the grooves 140 may be formed on the upper portion adjacent to the shutter switch.

Figure 5:
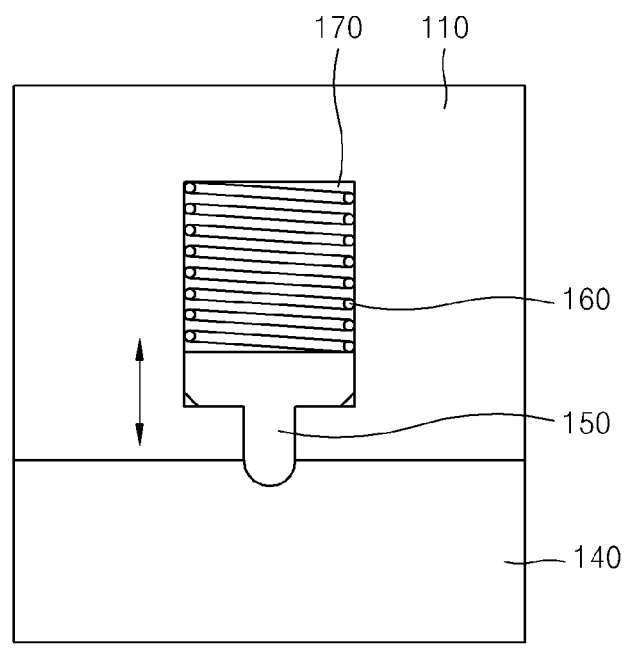
FIG. 5 is a cross-sectional view of an example of an elastic bias structure of an anti-escape protrusion of the camera of FIG. 2.

An anti-escape protrusion 150 that is elastically biased in a protruding direction is formed in the groove 140. The anti-escape protrusion 150 compresses the protruding piece 250 of the lens module 200 to prevent the lens module 200 from being dropped. FIG. 5 is a cross-sectional view of an example of an elastic bias structure of the anti-escape protrusion 150.

The mounting supporter 110 includes a receiving space 170 for receiving the anti-escape protrusion 150, and an elastic body 160 is disposed between an inner wall of the receiving space 170 and the anti-escape protrusion 150. A front edge of the anti-escape protrusion 150 may be rounded so that the protruding piece 250 of the lens module 200 may easily escape the anti-escape protrusion 150 and the lens module 200 may be separated from the main body 100 easily.

Figure 6:
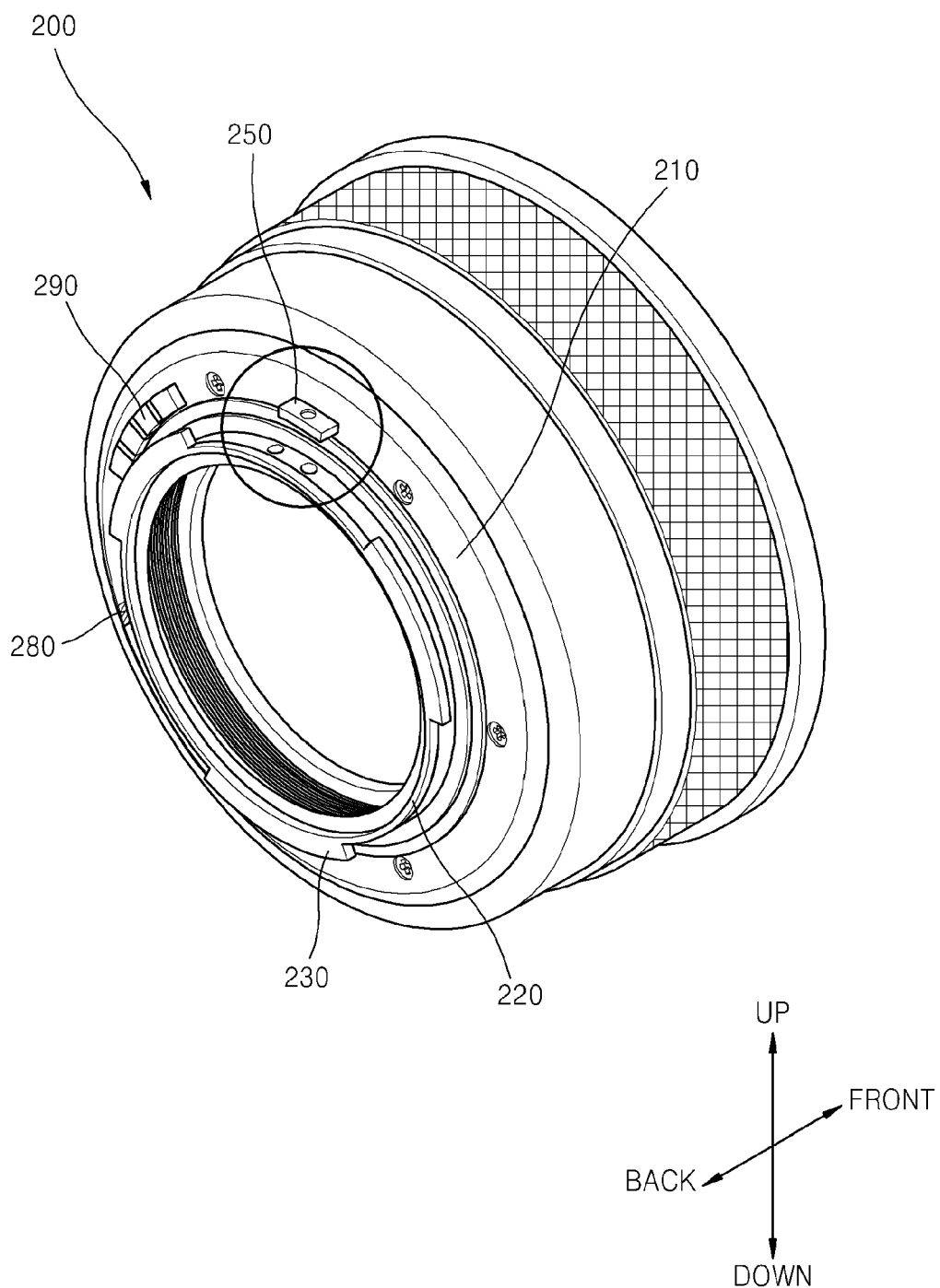
FIG. 6 is a perspective view of an example of the lens module illustrated in FIG. 1.

FIG. 6 is a perspective view of an example of the lens module 200, which is detachably mounted to the main body 100. The lens module 200 includes an optical structure (not shown) for focusing the subject image on the image sensor S. Although it is not shown in FIG. 6, the lens module 200 may include, for example, at least one optical lens that moves in front and rear directions, i.e., along an optical axis to perform a zooming operation or an auto focus (AF) operation, and a shutter and an iris adjusting an exposure amount (of light) on the image sensor S.

The lens module 200 includes a mounting supporter 210 facing the main body 100 to be supported by a large contact area, and the flange portion 230 protruding from a step on a rear portion of the mounting supporter 210 in a radial direction. The flange portion 230 may be formed on at least one portion along the circumference of the mounting supporter 210, for example, the flange portions 230 may be formed on three portions that divide the circumference equally into three parts. The flange portions 230 may be formed along a circular boundary 220, and the flange portions 230, which support the weight of the lens module 200, may be connected to each other via the circular boundary 220 to stably support the lens module 200. As shown in the example of FIG. 3, the flange portions 230 are inserted and fixed in the coupling pieces 130 of the main body 100.

The fixing recess 280, which is coupled to the fixing projection 180 of the main body 100, is formed on the mounting supporter 210 of the lens module 200. The fixing recess 280 integrally rotates with the lens module 200 according to operation of the user, and then, when the fixing recess 280 is coupled to the fixing projection 180 of the main body 100, the fixing recess 280 does not rotate any more to make a stable coupling status.

The protruding piece 250 protrudes backward from the mounting supporter 210 of the lens module 200. The protruding piece 250 may be formed on a portion that corresponds to the groove 140 of the main body 100. The protruding piece 250 may be formed on any portion on the mounting supporter 210, for example, on an upper portion of the mounting supporter 210 so as to stably support the lens module 200 against gravity.

Figure 7:
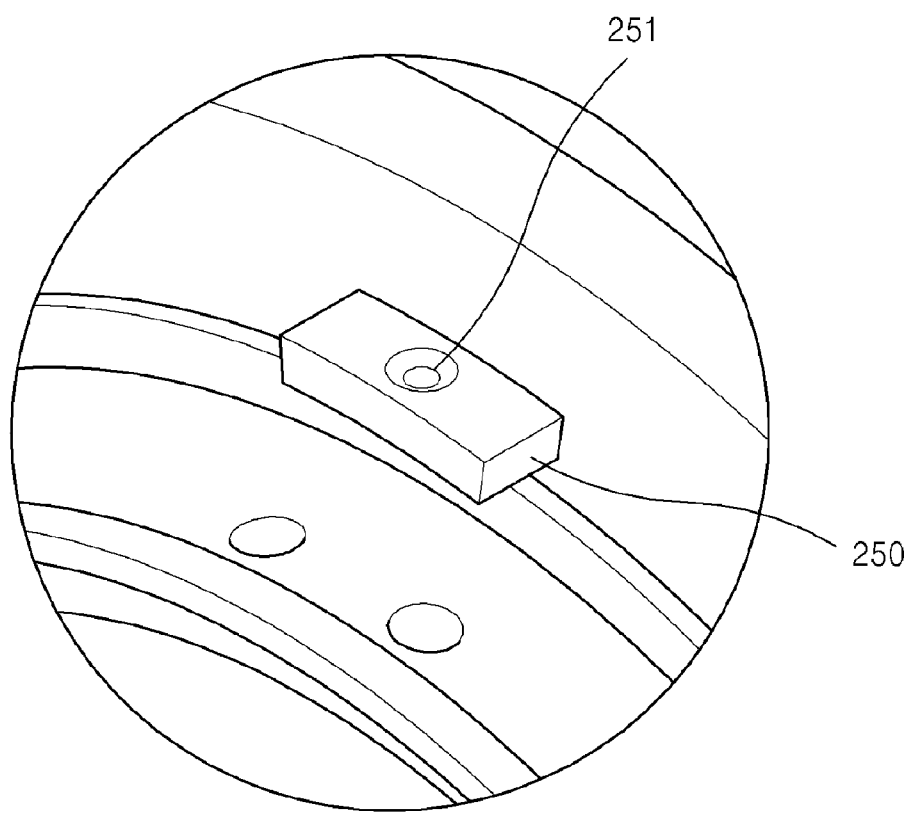
FIG. 7 is a perspective view of an example of a protruding piece illustrated in FIG. 6.

FIG. 7 is a perspective view of an example of a protruding piece. Referring to the example of FIG. 7, a mounting recess 251 having a shape matching the anti-escape protrusion 150 of the main body 100 is formed on the protruding piece 250. Because the mounting recess 251 is coupled to the anti-escape protrusion 150, the lens module 200 can be prevented from being dropped. The mounting recess 251 may have a cross-section a diameter of which is reduced in a thickness direction of the protruding piece 250. Because an inner wall of the mounting recess 251 is slanted, the mounting recess 251 may be easily separated from the anti-escape protrusion 150.

As shown in the examples of FIGS. 3 and 4, the coupling pieces 130 of the main body 100 and the flange portions 230 of the lens module 200 make a first coupling structure (130 and 230) between the main body 100 and the lens module 200. The first coupling structure may be changed to a coupled state or a released state according to a relative rotating state between the main body 100 and the lens module 200. The lens module 200 is coupled to the main body 100 at the mounting position P1, where the flange portions 230 overlap the coupling pieces 130, and is separated from the main body 100 at the detaching position P2, where the flange portions 230 are separated from the coupling pieces 130, while rotating along the main body 100. The first coupling structure (130 and 230) provides a strong coupling so that the lens module 200 is not freely separated from the main body 100.

Meanwhile, the anti-escape protrusion 150 and the protruding piece 250 make a secondary coupling structure (150 and 250) between the main body 100 and the lens module 200. The secondary coupling structure (150 and 250) prevents the lens module 200 from being dropped and being damaged on releasing the first coupling structure (130 and 230) between the main body 100 and the lens module 200. The secondary coupling structure (150 and 250) provides a weak coupling by using an elastic force of the anti-escape protrusion 150 that, for example, compresses the protruding piece 250 of the lens module 200. Therefore, the secondary coupling structure (150 and 250) provides a coupling that is weaker than that of the first coupling structure (130 and 230) so that the lens module 200 may be easily separated from the main body 100 by the operation from the user.

As shown in the examples of FIGS. 3 and 4, the secondary coupling structure (150 and 250) is changed into the coupled state or the releasing state according to the rotating state of the lens module 200 with respect to the main body 100. The secondary coupling structure (150 and 250) operates opposite to the first coupling structure (130 and 230) to complementary perform the coupling or the releasing operations. That is, the secondary coupling structure (150 and 250) is released when the lens module 200 is located at the mounting position P1 (refer to FIG. 3), and is coupled when the lens module 200 rotates to the detaching position P2 (refer to FIG. 4), and accordingly, the lens module 200 at the detaching position P2 may be prevented from being dropped. After that, the operational force of the user who wants to separate the lens module 200 from the main body 100 overrules the elastic force of the anti-escape protrusion 150 to separate the protruding piece 250 from the anti-escape protrusion 150, and accordingly, the lens module 200 may be completely separated from the main body 100.

The groove 140 is elongated along the circular arc of the mounting supporter 110 so as to receive the rotation of the protruding piece 250, which integrally rotates with the lens module 200, and a first end e1 and a second end e2 of the groove 140 may be connected to form a circular arc. Here, the anti-escape protrusion 150 is biased toward the second end e2 of the groove 140. The protruding piece 250 of the lens module 200 is adjacent to the first end e1 of the groove 140 at the mounting position P1 of the lens module 200, and is not coupled to the anti-escape protrusion 150.

When the lens module 200 rotates toward the detaching position P2, the protruding piece 250 of the lens module 200 is rotated toward the second end e2 of the groove 140 so that the protruding piece 250, more specifically, the mounting recess 251 of the protruding piece 250 is coupled to the anti-escape protrusion 150. Since the protruding piece 250 of the lens module 200 is elastically coupled to the anti-escape protrusion 150, the lens module 200 is temporarily fixed and the lens module 200 may be prevented from being dropped. The protruding piece 250 of the lens module 200 may be separated from the anti-escape protrusion 150, which is elastically biased, according to the operational force of the user, and the lens module 200 may be separated from the main body 100 safely.

Figure 8:
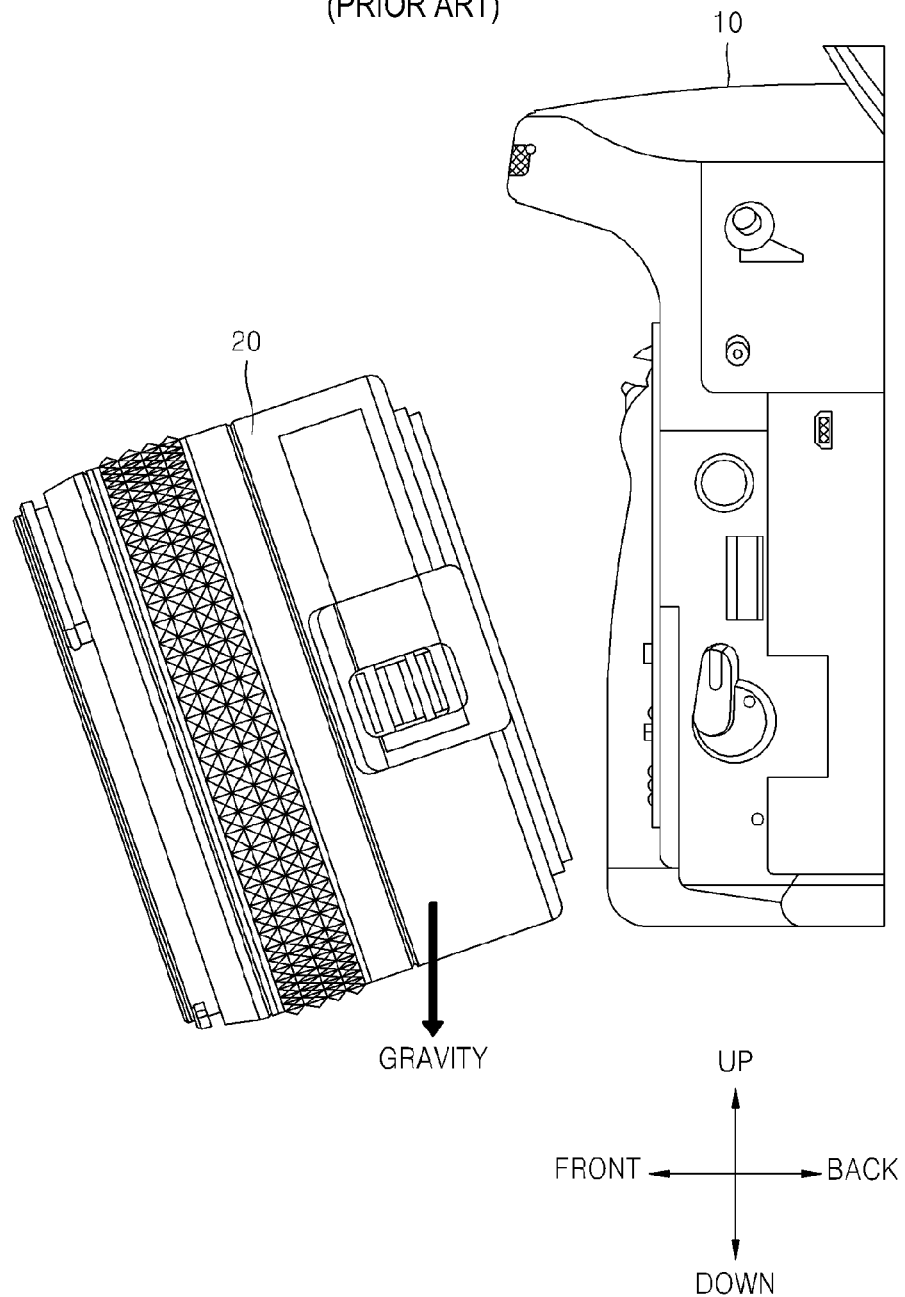
FIG. 8 is a side view illustrating an example of a lens module that is dropped when being detached from a main body of a camera.

FIG. 8 is a side view illustrating an example of a lens module that is dropped when being detached from a main body of a camera. As shown in the example of FIG. 8, in a camera that does not include the secondary coupling structure, a lens module 20 is dropped from a main body 10 of the camera upon being rotated to a detaching position of the lens module 20 due to the effects of gravity. However, in the camera illustrated in the example of FIG. 1, the secondary coupling structure (150 and 250) supports the lens module 200 from the upper portion (f position) against gravity. Accordingly, the separation of the lens module 200 from the main body 100 may be prevented due to a lever principle. Although it is not shown in the drawings, the shutter switch may be formed on an upper surface of the camera, and the secondary coupling structure (150 and 250) may be provided on a portion that is adjacent to the shutter switch.

Meanwhile, as shown in the examples of FIGS. 2 and 6, signal contact portions 190 and 290 which make electric contacts may be formed on portions of the mounting supporters 110 and 210 of the main body 100 and the lens module 200, respectively, to correspond to each other. The signal contact portions 190 and 290 are for relaying control signals between the main body 100 of the camera and the lens module 200, for example, various control signals for performing a zooming operation, an auto focus (AF) operation, an auto exposure (AE) operation, or an optical image stabilizer (OIS) operation of the lens module 200.

Figure 9:
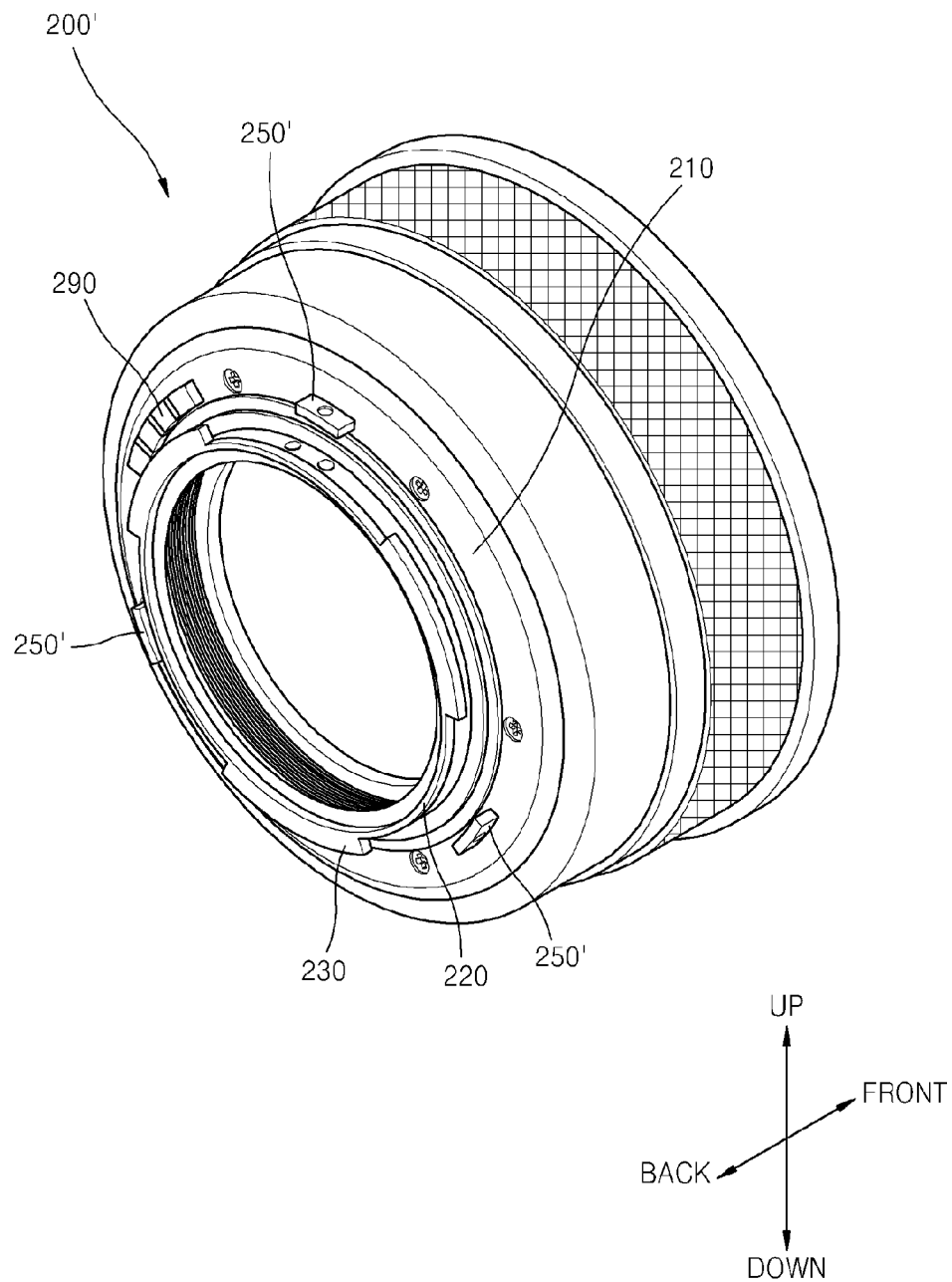
FIG. 9 is a perspective view of an example of a lens module according to another embodiment of the present invention.

FIG. 9 is a perspective view of an example of a lens module 200' according to a modified embodiment of the present invention. Referring to the example of FIG. 9, protruding pieces 250' are formed on portions that divide a circumference of the lens module 200' equally into three parts. Since the number of the protruding pieces 250' is increased and the protruding pieces 250' are formed symmetrically to each other, the lens module 200' may be supported stably. Although it is not shown in the example of FIG. 9, grooves that are formed on a circumference for receiving the protruding pieces 250' and anti-escape protrusions that may be coupled to the protruding pieces 250' may be formed on the main body.

Figure 10:
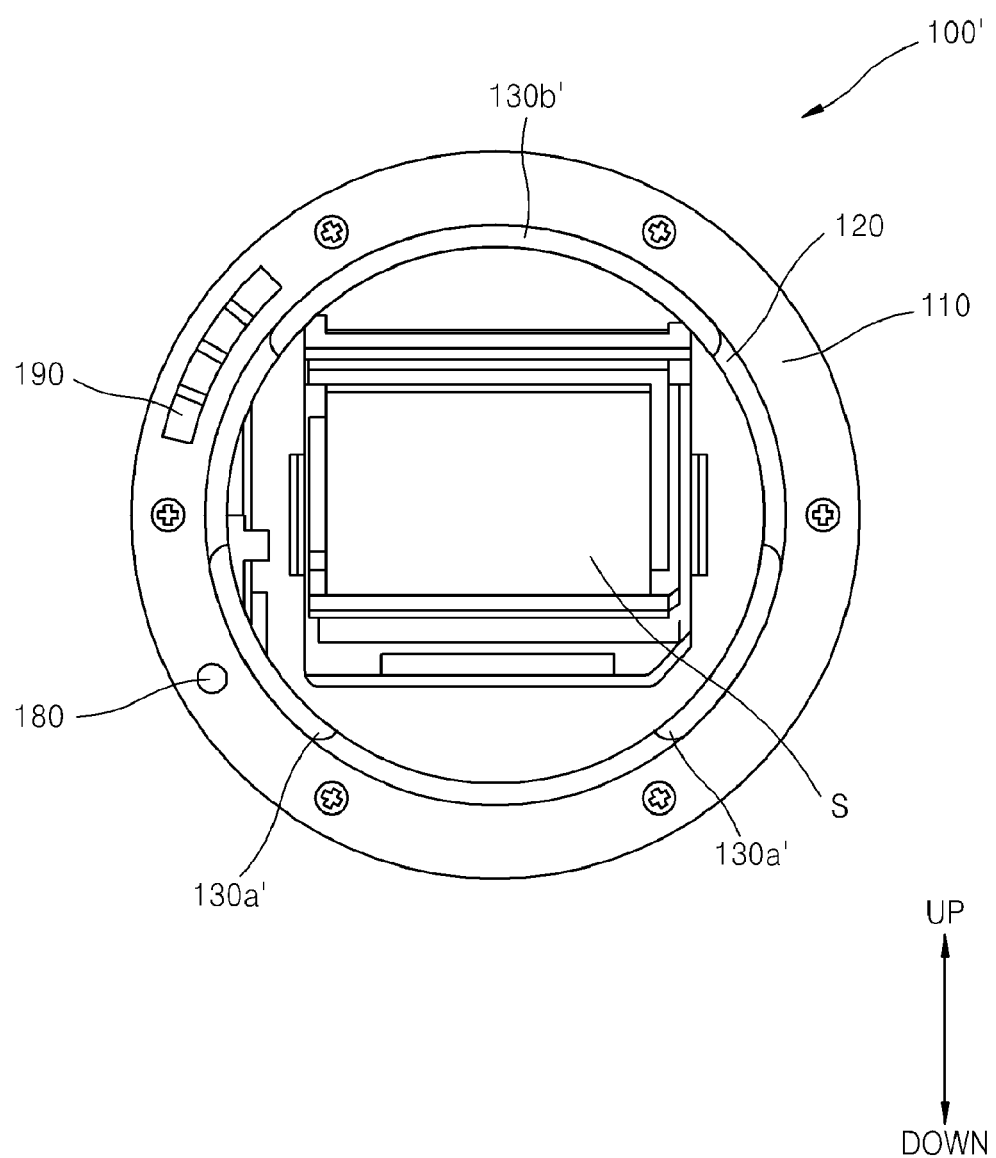
FIG. 10 is a diagram of examples of main parts of a main body of a camera according to another embodiment of the present invention.

FIG. 10 is a diagram of examples of main parts of a main body 100' of a camera according to another embodiment of the present invention. Referring to the examples of FIG. 10, a first coupling piece 130a' and a second coupling piece 130b' are disposed along the circumference of the rotating guide portion 120. Here, the second coupling piece 130b' may be disposed on an upper portion of the rotating guide portion 120 so as to resist against the gravity. In addition, the second coupling piece 130b' may be longer than the first coupling piece 130a'.

Figure 11:
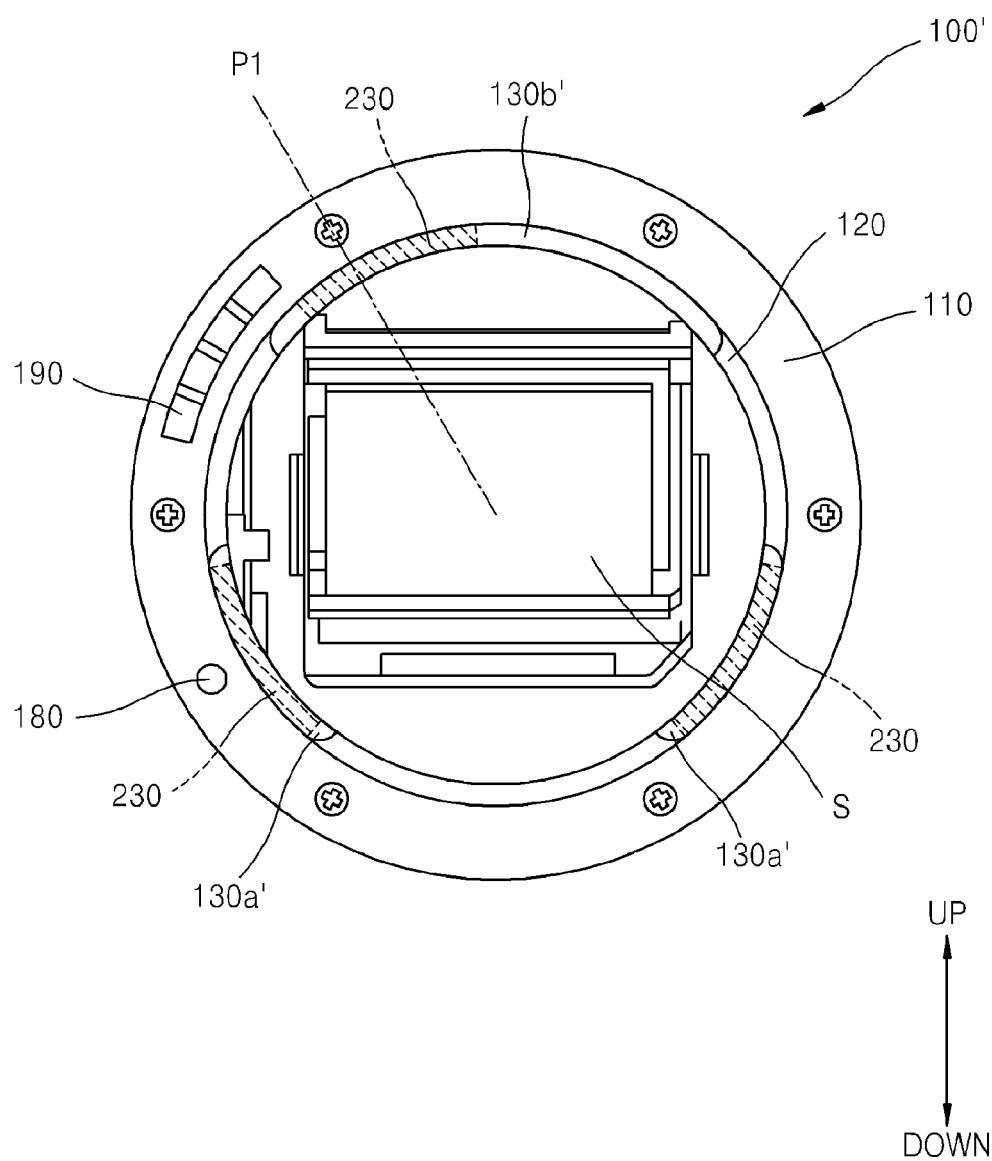
FIGS. 11 and 12 are diagrams illustrating examples of a mounting state and a detached state of the lens module in the camera illustrated in FIG. 10.
Figure 12:
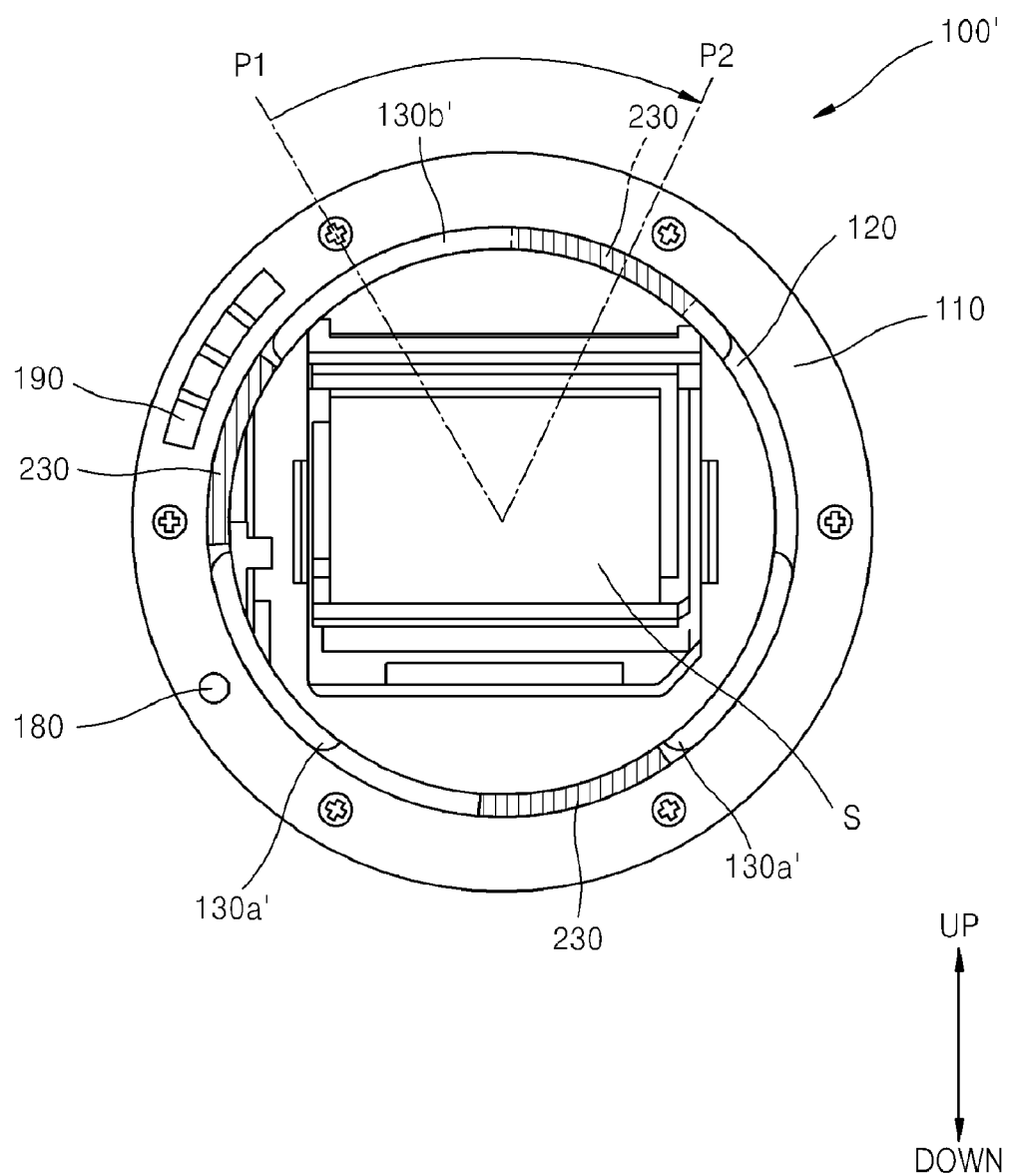

FIGS. 11 and 12 are diagrams illustrating examples of a mounting state and a detached state of the lens module in the camera illustrated in the example of FIG. 10. Referring to the examples of FIGS. 11 and 12, the flange portions 230 formed on the lens module 200 are integrally rotated with the lens module 200 to be inserted into the first and second coupling pieces 130a' and 130b' or released from the first and second coupling pieces 130a' and 130b'. Referring to the example of FIG. 11, the first and second coupling pieces 130a' and 130b' are coupled to the flange portions 230 at the mounting position P1 of the lens module 200 to support the lens module 200. Referring to the example of FIG. 12, at the detaching position P2 of the lens module 200, the coupling between the first coupling piece 130a' and the flange portion 230 is released, however, the coupling between the second coupling piece 130b' and the flange portion 230 is maintained. The lens module 200, an upper portion of which is fixed onto the main body 100, is not directly separated from the main body 100 at the detaching position P2, and accordingly, damage to the lens module 200 caused by dropping the lens module 200 may be prevented. The first and second coupling pieces 130a' and 130b' and the corresponding flange portions 230 providing the coupling force at the mounting position P1 of the lens module 200 form a first coupling structure, and the second coupling piece 130b' and the corresponding flange portion 230 providing the coupling force at the detaching position P2 of the lens module 200 form a secondary coupling structure.

The lens module 200 that is temporarily fixed by the second coupling piece 130b' may be separated from the second coupling piece 130b' by the operation of user, for example, pulling the lens module 200 downward or slanting the lens module 200 upward, and thus may be separated from the main body 100' of the camera.

According to the camera having the detachable lens module of the present invention, the secondary coupling structure, which maintains the temporary fixing state of the lens module at the detaching position of the lens module, is provided, and accordingly, the lens module may be prevented from being dropped when the lens module is detached from the main body.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A camera comprising:
   a main body;
   a lens module configured so that it can be mounted to or detached from the main body according to a rotating state of the lens module with respect to the main body;
   a first coupling structure that is configured to provide the lens module with coupling when the lens module is set to a mounting position; and
   a secondary coupling structure that is configured to provide the lens module with temporary coupling when the lens module is set to a detaching position.

2. The camera of claim 1, wherein the first coupling structure is configured to be in a coupled state when the lens module is set to the mounting position, and is configured to be in a released state when the lens module is set to the detaching position.

3. The camera of claim 1, wherein the secondary coupling structure is configured to be in a released state when the lens module is set to the mounting position, and is configured to be in a coupled state when the lens module is set to the detaching position.

4. The camera of claim 1, wherein the first coupling structure comprises:
   flange portions configured to rotate integrally with the lens module; and
   coupling pieces configured so as to form a gap with the main body so that the flange portions are insertable into the gap according to the rotating state of the lens module.

5. The camera of claim 4, wherein the flange portions are configured to be inserted between the coupling pieces and a rotating guide portion which are configured so as to be separated from each other on the camera body according to the rotating state of the lens module with respect to the main body.

6. The camera of claim 4,
wherein the flange portions are configured to be restricted by the coupling piece when the lens module is set to the mounting position, and
wherein the flange portions are configured to be released from the coupling piece when the lens module is set to the detaching position.

7. The camera of claim 1, wherein the secondary coupling structure comprises:
a protruding piece that is formed on the lens module; and
an anti-escape protrusion that is formed on the main body and configured to be coupled to the protruding piece.

8. The camera of claim 7,
wherein the main body includes a groove that extends in a circumferential direction and is configured so as to receive a rotating range of the protruding piece, which is configured to rotate with the lens module, and
wherein the anti-escape protrusion is formed in the groove.

9. The camera of claim 8, wherein the anti-escape protrusion is elastically biased so as to protrude into the groove.

10. The camera of claim 8,
wherein the protruding piece is configured to move between a first end and a second end of the groove according to a rotating variation between the mounting position and the detaching position of the lens module, and
wherein the anti-escape protrusion is biased toward the second end of the groove.

11. The camera of claim 7, wherein the protruding piece includes a mounting recess having a shape matching the anti-escape protrusion.

12. The camera of claim 7, wherein a front edge of the anti-escape protrusion is rounded.

13. The camera of claim 7,
wherein the lens module and the main body respectively have contact areas that support each other along the circumferential direction, and
wherein the protruding piece and the anti-escape protrusion are formed adjacent to a shutter switch within the contact areas.

14. The camera of claim 7, wherein two or more protruding pieces and two or more anti-escape protrusions are formed on the lens module and the main body, respectively, at corresponding portions to each other.

15. A camera comprising:
a main body; and
a lens module configured so that it can be mounted to or detached from the main body according to a rotating state of the lens module with respect to the main body,
wherein the main body includes a first coupling piece that is configured to provide the lens module with coupling when the lens module is set to a mounting position, and a second coupling piece that is disposed on a circumferential line with the first coupling piece and that is configured to provide the lens module with temporary coupling when the lens module is set to a detaching position, and
wherein the lens module includes flange portions that are configured to correspond to the first and second coupling pieces and that are disposed on a circumferential line, and which are configured to be inserted into the first and second coupling pieces.

16. The camera of claim 15, wherein the first coupling piece is configured to be coupled to the flange portion at the mounting position, and is configured to be released from the flange portion at the detaching position.

17. The camera of claim 15, wherein the second coupling piece is configured to be coupled to the flange portion at the mounting position and the detaching position.

18. The camera of claim 15, wherein the first and second coupling pieces extend in an arc shape, and the second coupling piece is longer than the first coupling piece.

19. The camera of claim 15, wherein the second coupling piece is configured to be closer to a shutter switch than the first coupling piece.

* * * * *